United States Patent [19]
Machii et al.

[11] Patent Number: 5,705,240
[45] Date of Patent: Jan. 6, 1998

[54] COATED METAL PLATE FOR CANS AND SEAMLESS CANS FORMED THEREFROM

[75] Inventors: Sachiko Machii, Yokohama; Kenichirou Nakamaki, Hiratsuka; Masanori Aizawa; Katsuhiro Imazu, both of Yokohama, all of Japan

[73] Assignee: Toyo Seikan Kaisha, Ltd., Tokyo, Japan

[21] Appl. No.: 613,450

[22] Filed: Mar. 1, 1996

Related U.S. Application Data

[63] Continuation of Ser. No. 172,828, Dec. 27, 1993, abandoned.

[30] Foreign Application Priority Data

Dec. 25, 1992 [JP] Japan ................................. 4-347258

[51] Int. Cl.$^6$ .................................................. B29D 23/00
[52] U.S. Cl. .................... 428/35.9; 428/35.7; 428/35.8; 428/36.9; 428/36.91; 428/457; 428/458; 220/906
[58] Field of Search ...................... 428/35.7, 35.8, 428/35.9, 457, 458, 36.9, 36.91; 220/906

[56] References Cited

U.S. PATENT DOCUMENTS

| | | | |
|---|---|---|---|
| 4,143,790 | 3/1979 | Ueno et al. | 220/458 |
| 4,362,775 | 12/1982 | Yabe et al. | 428/213 |
| 5,093,208 | 3/1992 | Heyes et al. | 428/623 |
| 5,137,762 | 8/1992 | Aizawa et al. | 539/35.8 |
| 5,144,824 | 9/1992 | Kobayashi et al. | 72/46 |
| 5,288,559 | 2/1994 | Oka et al. | 428/482 |

FOREIGN PATENT DOCUMENTS

3436412  4/1986  Germany.

*Primary Examiner*—James J. Seidleck
*Assistant Examiner*—Michael Williamson
*Attorney, Agent, or Firm*—Sughrue, Mion, Zinn, Macpeak & Seas, PLLC

[57] ABSTRACT

A polyester laminated draw-formed can which suppresses frothing phenomenon when a carbonated beverage is contained therein and exhibits excellent corrosion resistance, and a coated metal plate used for the production of the cans. The coated metal plate for cans comprises a laminated material of a metal plate, a polyester film layer consisting chiefly of ethylene terephthalate units and, as required, an adhesive primer layer interposed between the metal plate and the polyester film, wherein the polyester film layer that is on the inner surface side of the can has a surface that is molecularly oriented in at least the biaxial directions, and larger protrusions on the surface over a visual field of 100 μm×100 μm as observed using an interatomic force microscope (AFM) have an average height (H) of three points of 0.20 μm or smaller.

6 Claims, 6 Drawing Sheets

COATED METAL PLATE FOR CANS AND SEAMLESS CANS FORMED THEREFROM

This is a continuation of application Ser. No. 08/172,828 filed 27 Dec. 1993, now abandoned.

BACKGROUND OF THE INVENTION

(1) Field of the Invention

The present invention relates to a coated metal plate for cans and seamless cans draw-formed therefrom. More particularly, the invention relates to drawn cans that are capable of effectively preventing the frothing of carbonated beverages and having excellent corrosion resistance and to a coated metal plate used for producing the drawn cans.

(2) Description of the Prior Art

A number of proposals have been already made for producing seamless cans by using a laminated material obtained by laminating a thermoplastic resin film such as of a polyethelene terephthalate (PET) on the side that becomes the inner surface of a can of a metal blank.

For example, Japanese Laid-Open Patent Publications Nos. 170532/1985 and 172837/1985 disclose methods of producing draw-ironed cans in which a blank having an oriented thermoplastic resin film such as of PET adhered onto at least the surface of a metal blank that becomes the inner surface of the container, is subjected to the draw-ironing between a punch and a die at a temperature suited for drawing the resin, in order to impart molecular orientation to the film layer.

In recent years, japanese Laid-Open Patent Publication No. 98844/1991 is disclosing a draw-formed or draw-ironed can obtained by forming a seamless can from a laminate of a metal blank and a copolymerized polyester film having a melting point of 170° to 252° C. which chiefly comprises ethylene terephthaiate units and small amounts of other ester units provided directly or via an adhesive primer on the side of the metal blank that becomes at least the inner surface of the can, the copolymerized polyester film containing anti-blocking agent particles that are buried under the surface of the film.

A drawn film such as of PET usually contains anti-blocking agent particles such as of silica in order to improve processability into films and handling property as well as to decrease the tendency of adhesion between the films. The anti-blocking agent particles form tiny protrusions on the surface of the film to produce anti-blocking action.

When the laminate of a film containing anti-blocking agent particles is subjected to the ironing or to a deep drawing to a high degree, stress is concentrated on the portions of the anti-blocking agent particles that are protruding resulting in the development of such defects as fine pinholes, cracks or breakage in the film. According to the above-mentioned proposal, the anti-blocking agent protruded on the surface is buried under the surface of the film by melting in order to prevent the above defects.

When carbonated beverages are contained and hermetically sealed in the known PET laminated draw-formed cans, however, there arouse problems that must be solved with respect to corrosion resistance and opening stability.

That is, the above-mentioned proposal surely helps prevent the development of scars or coating defects during the drawing. However, since the surface of the film has been melted, the film loses molecular orientation, whereby barrier property decreases against the corrosive components and underfilm corrosion takes place.

On the other hand, when the can made of a steel plate laminated with a biaxially oriented polyester film containing carbonated beverage is opened, the content spouts out as bubbles through the opening and becomes insipid.

SUMMARY OF THE INVENTION

The object of the present invention therefore is to provide a coated metal plate for cans and a seamless can in which a frothing phenomenon is suppressed when a carbonated beverage is contained therein and which exhibits excellent corrosion resistance.

According to the present invention, there is provided a coated metal plate for cans comprising a laminated material of a metal plate, a polyester film layer consisting chiefly of ethylene terephthalate units and, as required, an adhesive primer layer interposed between the metal plate and the polyester films, wherein the polyester film layer that is on the inner surface side of the can has a surface that is molecularly oriented in at least the biaxial directions, and larger protrusions on the surface over a visual field of 100 μm×100 μm as observed using an interatomic force microscope (AFM) have an average height (H) of three points of 0.20 μm or smaller.

According to the present invention, furthermore, there are provided seamless cans such as thickness-reduced draw-formed cans or draw-ironed cans obtained by draw-ironing the above-mentioned coated metal plate by subjecting the coated metal plate to the draw-redraw working and then bend-elongating the side walls of the barrel during the redraw working.

In the polyester film layer that is on the inner surface side of the can, it is desired that larger recesses on the surface over a visual field of 100 μm×100 μm as observed using an interatomic force microscope (AFM) have an average depth (D) of three points of 0.020 μm or smaller.

In order to accomplish the average height (H) of three points of 0.20 μm or smaller and, particularly, 0.15 μm or smaller as measured using the AFM, the anti-blocking agent contained in the polyester film should have a grain size of from 0.05 to 0.7 μm and particularly, from 0.07 to 0.5 μm.

DESCRIPTION OF REFERENCE NUMERALS

| | |
|---|---|
| 1 | laminated material |
| 2 | metal substrate |
| 3 | adhesive primer layer |
| 4 | polyester layer |

DETAILED DESCRIPTION OF THE INVENTION

The present invention is based on a discovery that the frothing phenomenon is effectively prevented when a can containing a carbonated beverage is opened and that excellent corrosion resistance is obtained provided the polyester layer on the inner surface side of a laminated material used for the production of seamless cans has the surface which is molecularly oriented in at least the biaxial directions and has protrusions whose average height (H) of three protrusions is 0.20 µm or smaller on the surface over a visual field of 100 µm×100 µm as observed using the AFM.

The interatomic force microscope (AFM) is the one which electrically measures the ruggedness on the surface precisely and finely by utilizing the interatomic repelling force between the surface to be measured and the pin to be measured, and is capable of precisely detecting even fine ruggedness on the surface of a smooth biaxially drawn film.

Figure 1:
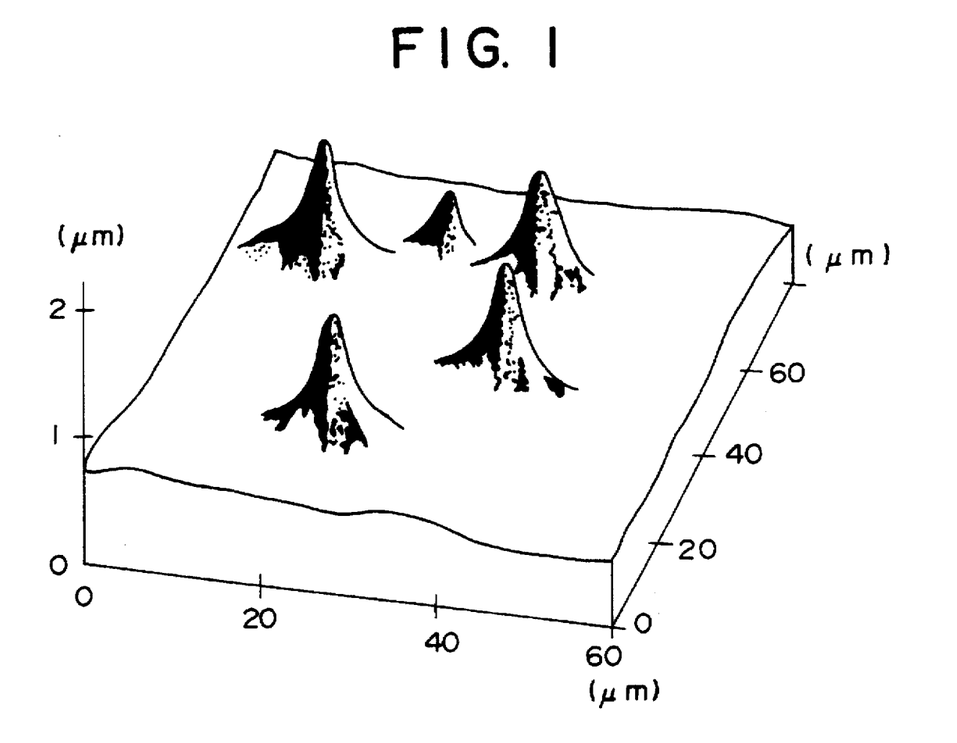
FIG. 1 is a diagram displaying the surface of a polyester layer of a conventional draw-formed can produced by using a biaxially drawn polyester-laminated steel plate as observed using an interatomic force microscope.
Figure 2:
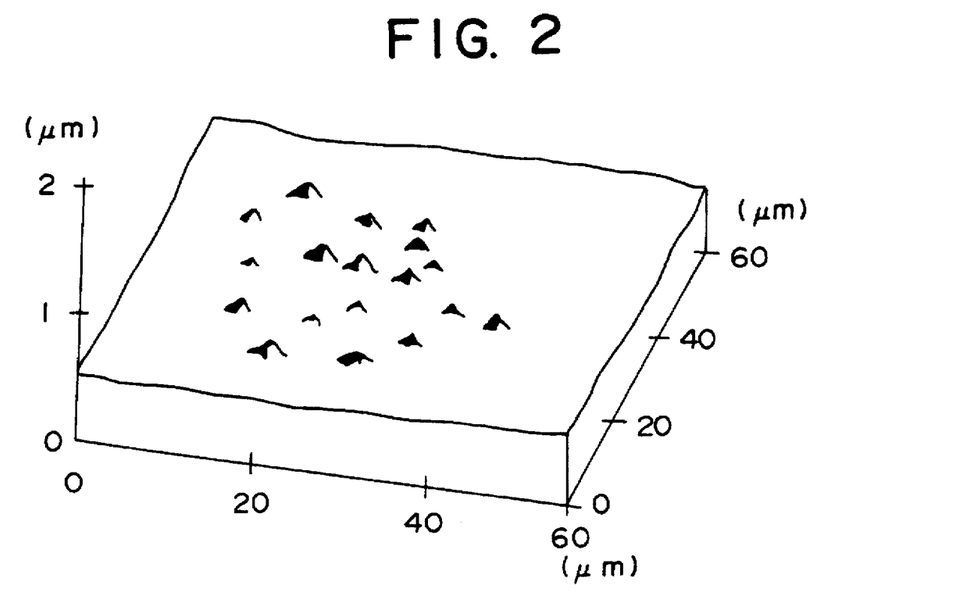
FIG. 2 is a diagram displaying the surface of a polyester layer of a draw-formed can of the present invention as observed using the interatomic force microscope.

FIG. 1 is a diagram displaying the surface of a polyester layer on the bottom of a draw-formed can produced by draw-forming a conventional biaxially drawn polyester-laminated steel plate as observed using an interatomic force microscope and FIG. 2 is a diagram displaying the surface of a polyester layer on the bottom of a draw-formed can of the present invention as observed using the interatomic force microscope. It will be understood from these drawings that the degree of ruggedness on the surface have been distinctly measured.

That is, the biaxially drawn polyester film has fine ruggedness even when the anti-blocking agent particles blended therein are not exposed to the outer surface. It was found that the presence of ruggedness and, particularly, protrusions seriously affect the frothing.

Figure 3A:
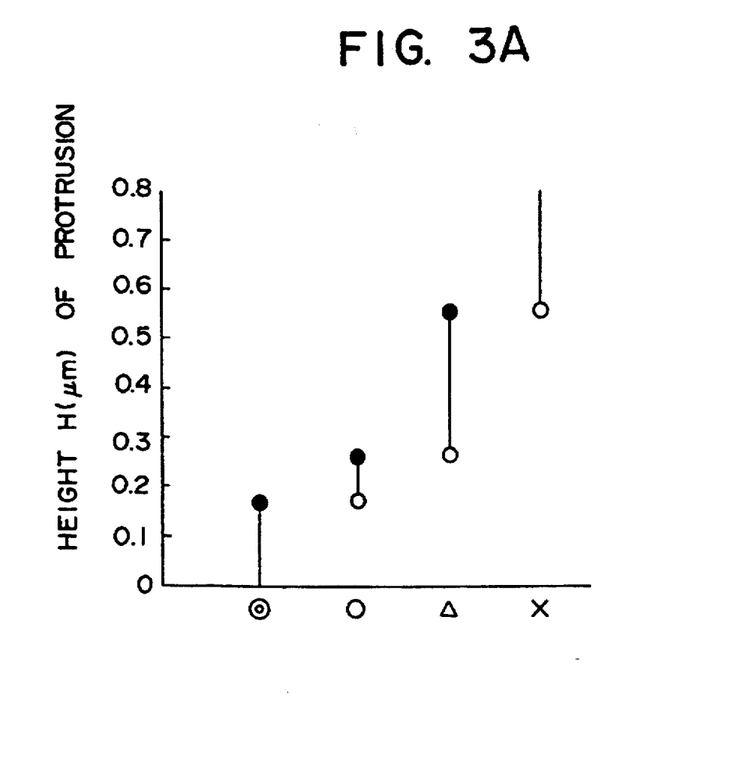
FIG. 3 is a graph showing relationships between the average height (H) of three protrusions on the inner surface of the can and the frothing degree of a carbonated beverage in the can using thin draw-formed cans produced by using various polyester laminated materials.
Figure 3B:
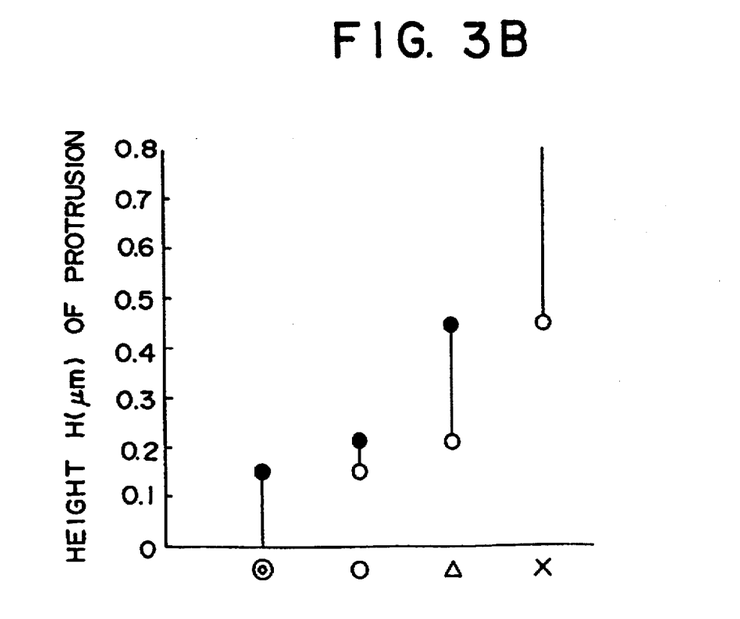

FIG. 3 is a graph showing relationships between the average height (H) of three protrusions and the frothing degree of the can containing carbonated beverage of draw-formed cans obtained by draw-forming and redraw-forming and reducing the thickness of the can by bending and elongating the side wall portion of the can barrel in redraw-forming (for details, reference should be made to Examples appearing later) which are produced by using a variety of biaxially drawn polyester film-laminated steel plates having a film applied to the inner surface side. The diagram A shows an average height (H) of three points found at a height 100 mm of the can and the diagram B shows an average height (H) of three points found at the bottom of the can. The lines in the drawings represent ranges where predetermined frothing evaluation is obtained.

⊚: No frothing takes place through the opening.

○ Can closure is partly wetted with the frothing.

Δ: Whole surface of the can closure is wetted with the frothing.

X: Froth flows over the edge of the can closure.

Though the same cans are evaluated in FIG. 3, those cans which are poorly evaluated have protrusions that are greater at high positions on the side walls than the protrusions on the bottom of the cans and those cans which are highly evaluated have protrusions which are nearly of the same level even at high positions on the side walls as the protrusions on the bottom of the cans. This is because the plastic flow does not almost take place on the bottom of the can during the drawing work, but takes place at higher portions on the side wall in a manner that the polyester layer is drawn in the axial direction but is compressed in the circumferential direction. This means that the size of the protrusions is expanded when the protrusions on the initial surface of the film is greater than a predetermined value. This tendency becomes particularly conspicuous when the thickness of the side wall of the can is reduced by being elongated by bending or when the thickness is reduced by ironing.

It will be understood from the above results that the cans produced by draw-forming a conventional biaxially oriented polyester film-laminated steel plate have average heights (H) of three protrusions of about 0.45 µm or greater and permit frothing to take place vigorously, whereas the cans having average heights (H) of three points of 0.20 µm or smaller and, particularly, 0.15 µm or smaller make it possible to effectively suppress the frothing when the cans are opened.

The fact that the protrusions of the biaxially drawn polyester film on the inner surface of the draw-formed can are intimately related to the frothing phenomenon was discovered for the first time as a phenomenon through an extensive study, which according to the present inventors are attributed as described below.

That is, when the draw-formed can is charged with a carbonated beverage as a content, it is considered that fine bubbles of carbonic acid gas are formed with protrusions on the inner surface as nuclei. When the can is opened under this condition, the bubbles grow abruptly due to a decrease in the pressure and spout out through the opening. The action of nuclei for forming bubbles of carbonic acid gas is closely related to the size of the protrusions on the inner surface. When the size is 0.20 µm as described above, the protrusions do not act as nuclei and the frothing is suppressed.

On the inner surface of the polyester layer, the size of the protrusions and the size of the recesses are related to each other; i.e., the higher the protrusions, the deeper the recesses.

Figure 4A:
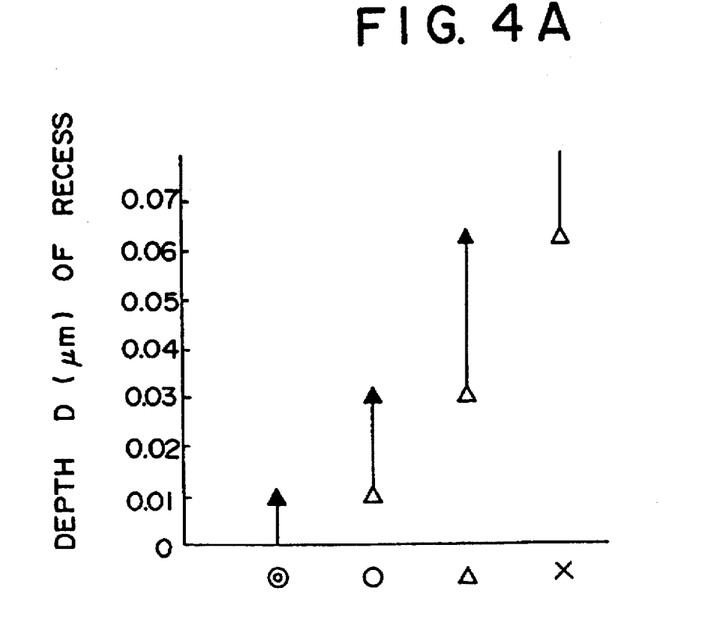
FIG. 4 is a graph showing relationships between the average depth (D) of three recesses in the inner surface of the can and the frothing degree of a carbonated beverage in the can using the same thin draw-formed cans as those of FIG. 3.
Figure 4B:
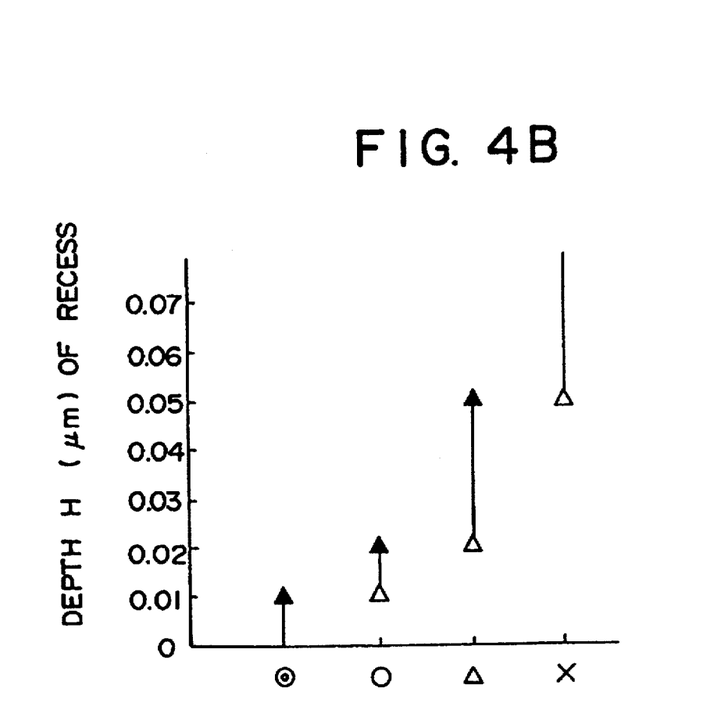

FIG. 4 is a graph showing relationships between the average depth (D) of three recesses and the frothing degree of a carbonated beverage in the can using the same thin draw-formed cans obtained by reducing the thickness by bending and elongating the side wall portion in redraw-forming as in FIG. 3, from which it will be obvious that the frothing is effectively suppressed when the average depth (D) of three points is 0.020 µm or smaller and is, particularly, 0.015 µm or smaller.

According to the present invention, the average height (H) of three points is suppressed to be 0.20 µm or smaller and the average depth (D) of three points is suppressed to be 0.02 µm or smaller in the surface of the biaxially drawn polyester film by blending the film with an anti-blocking agent having a grain size of from 0.01 to 0.7 µm and, particularly, from 0.05 to 0.5 µm.

Figure 5A:
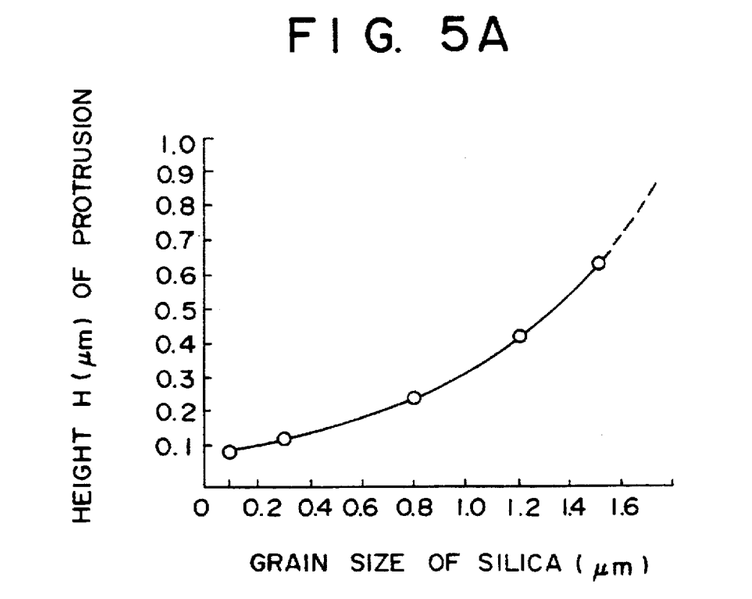
FIG. 5 is a graph showing relationships among the grain size of the anti-blocking agent that is used, the average height (H) of three points on the film surface, and the average depth (D) of three points in the film surface.
Figure 5B:
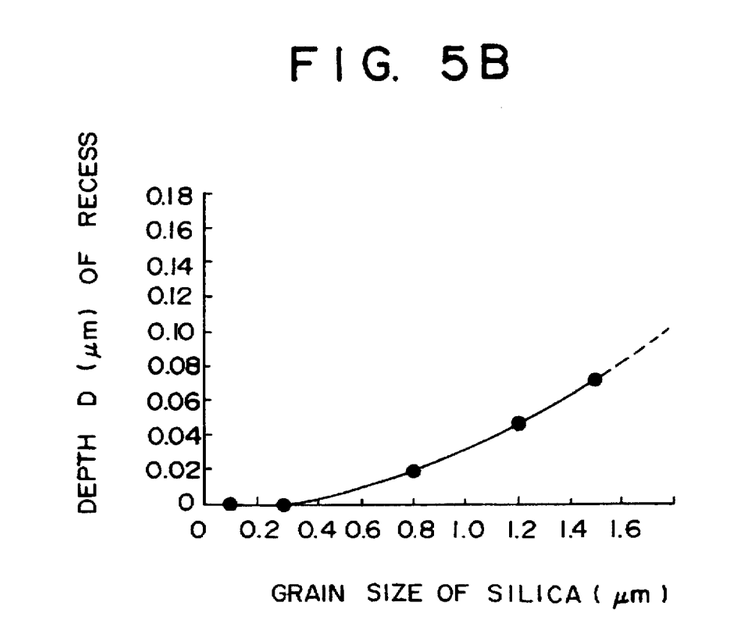

In FIG. 5, the diagram A shows a relationship between the grain size of the anti-blocking agent (silica) and the average height (H) of three points on the surface of the film on the bottom of the can, and the diagram B shows a relationship between the grain size of the anti-blocking agent (silica) and the average depth (D) of three points on the bottom of the can, from which it will be understood that the height H and the depth D can be suppressed to lie within ranges specified by the present invention by using the anti-blocking agent having grain sizes of 0.7 μm or smaller and, particularly, 0.5 μm or smaller. When the grain size of the anti-blocking agent becomes 0.05 μm or smaller, on the other hand, the film develops blocking which impairs the working efficiency.

The degree of ruggedness on the surface of the polyester film varies depending upon the conditions of forming the film and upon the conditions of heat-adhesion. In general, the height of the protrusion increases with an increase in the degree of surface orientation. Moreover, the height of protrusion decreases with an increase in the temperature during the heat-adhesion. Therefore, these conditions are so set as to satisfy the requirements of the present invention. According to the present invention in which biaxial molecular orientation of the film is maintained unchanged, excellent barrier property is exhibited even for such contents as carbonated beverages that have large corrosion tendencies. Therefore, the underfilm corrosion is prevented and frothing phenomenon is effectively prevented, too, when the can is opened, which are great advantages.

Laminated Material

Figure 6:
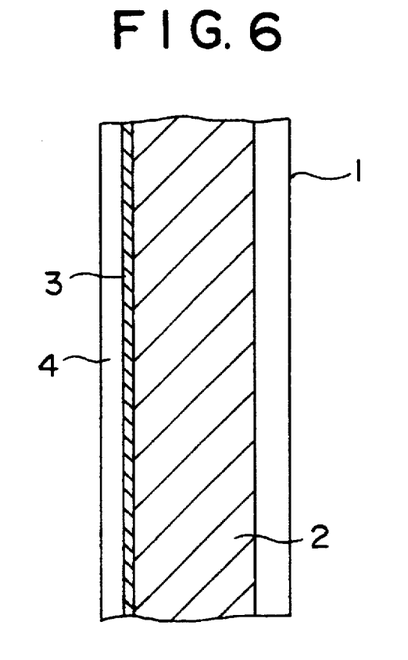
FIG. 6 is a sectional view illustrating a sectional structure of a laminated material used for the present invention.

Referring to FIG. 6, a laminated material 1 used for the present invention comprises a metal blank 2, an adhesive primer layer 3 provided on the side of the metal blank that becomes the inner surface of the can, and a polyester film layer 4 provided via the primer layer.

Figure 7:
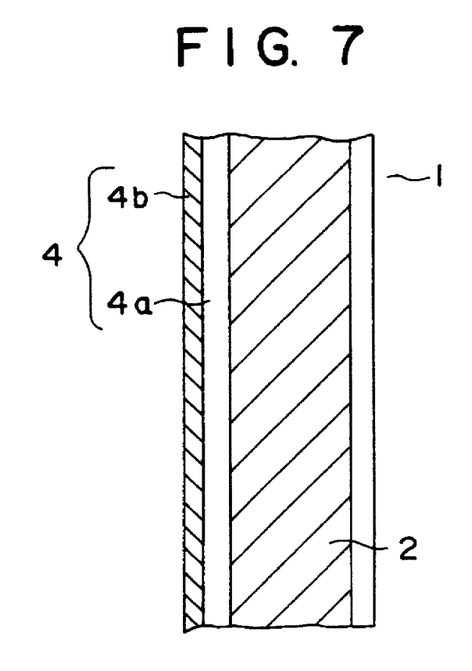
FIG. 7 is a sectional view illustrating another sectional structure of a laminated material used for the present invention.

Referring to FIG. 7, another laminated material 1 that is used for the present invention comprises the metal blank 2 and a polyester film layer 4 that is directly heat-adhered to the metal blank. The polyester film layer 4 is melt-adhered with its surface layer 4a only that is in contact with the metal blank 1, and maintains biaxially drawn molecular orientation in the layer 4b of the remaining majority portion thereof.

According to the present invention, there can be used, as a metal blank, a variety of surface-treated steel plates and a light metal plate such as of aluminum.

As the surface-treated steel plate, there can be used a cold-rolled steel plate that is annealed, subjected to the secondary cold rolling, and is then subjected to one kind, two kinds or more kinds of surface treatments such as zinc plating, tin plating, nickel plating, electrolytic chromate treatment, chromate treatment and like treatment. Different platings or surface treatments can be effected for the front and back surfaces of the plate. A preferred example of the surface-treated steel plate is an electrolytic chromate-treated steel plate which has 10 to 100 mg/m² of a metal chromium layer and 1 to 50 mg/m² (reckoned as metal chromium) of a chromium oxide layer, exhibiting excellent adhesion to the coating or the film and corrosion resistance in combination. Another example of the surface-treated steel plate is a tin plate plated with tin in an amount of 0.1 to 11.2 g/m². It is desired that the tin plate is subjected to the dichromate treatment, chromate treatment, or chromate/phosphate treatment such that the amount of chromium is from 1 to 30 mg/m² reckoned as metal chromium.

As a light metal plate, there can be used a so-called pure aluminum plate as well as an aluminum alloy plate. The aluminum alloy plate that is excellent in corrosion resistance and workability has a composition of 0.0 to 1.5% by weight of Mn, 0.0 to 5% by weight of Mg, 0.01 to 0.3% by weight of Zn, 0.01 to 0.25% by weight of Cu, 0.01 to 0.25% by weight of Cr, and the remainder of Al. It is desired that even these light metal plates are subjected to the surface treatment from the standpoint of intimate adhesiveness to the coating or the film and corrosion resistance. The surface treatment may be chromium treatment, zirconium treatment, phosphate treatment, alumite treatment, acrylate treatment or the like treatment. Among them, it is desired to effect the chromate treatment or the chromate/phosphate treatment such that the amount of chromium is from 5 to 300 mg/m² reckoned as metal chromium.

The blank thickness (A) of the metal plate differs depending upon the kind of the metal and use or size of the container. Generally, however, the thickness should be from 0.10 to 0.50 mm. in the case of the surface-treated steel plate, the thickness should be from 0.10 to 0.40 mm and in the case of the light metal plate, the thickness should be from 0.15 to 0.50 mm.

The polyester that is used comprises chiefly ethylene terephthalate units and may be a homopolyester but should preferably be a copolyester containing other ester units in small amounts. In general, it is desired that 70 mol % or more and, particularly, 75 mol % or more of the dibasic acid component in the copolymerized polyester comprises a terephthalic acid component, 70 mol % or more and, particularly, 75 mol % or more of the diol component comprises an ethylene glycol, 1 to 30 mol % and, particularly, 5 to 25 mol % of the dibasic acid component and/or the diol component comprise a dibasic acid component other than terephthalic acid and/or a diol component other than ethylene glycol.

Examples of the dibasic acid other than terephthalic acid include aromatic dicarboxylic acids such as isophthalic acid, phthalic acid, naphthalenedicarboxylic acid and the like; alicyclic dicarboxylic acids such as cyclohexanedicarboxylic acid and the like; aliphatic dicarboxylic acids such as succinic acid, adipic acid, sebacic acid, dodecanedioic acid and the like, which may be used alone or in a combination of two or more kinds. Examples of the diol component other than ethylene glycol include propylene glycol, 1,4-butanediol, diethylene glycol, 1,6-hexyleneglycol, cyclohexanedimethanol, ethylene oxide adduct of bisphenol A and the like, which may be used alone or in a combination of two or more kinds.

The polyester that is used should have a molecular weight that is sufficient for forming a film. For this purpose, the polyester should have an inherent viscosity (I.V.) of from 0.55 to 1.9 dl/g and, particularly, from 0.65 to 1.4 dl/g. Moreover, the polyester should have an ethylene glycol unit content of from 1.5 mol % to 5.0 mol % from the standpoint of maintaining surface orientation and suppressing the protrusions from expanding during the plastic deformation of the film. It is desired that the polyester has a melting point of from 170° to 252° C. and, particularly, from 210° to 252° C.

Any anti-blocking agent can be contained in the film such as an inorganic anti-blocking agent of the type of silica, calcium carbonate, alumina, silica-alumina, methane, clay, zeolite and the like as well as an organic anti-blocking agent such as crosslinked resin particles, provided their grain sizes lie within the aforementioned range. Amorphous silica can be advantageously used since it is easily available. The anti-blocking agent is usually contained in an amount of from 0.01 to 3.0% by weight and, particularly, in an amount of from 0.03 to 0.5% by weight.

According to the present invention, there can be used a composite anti-blocking agent containing, as a first component, anti-blocking agent particles of sizes of from 0.05 μm to 0.5 μm in an amount of from 0.01 to 2.5% by weight and, as a second component, anti-blocking agent particles having sizes larger by more than 0.2 μm than the first component but are 0.7 μm or smaller in an amount of from 0.005 to 2.0% by weight.

It is important that the polyester film has been biaxially drawn. The degree of biaxial orientation can be confirmed by the polarized fluorometric method, double refraction method or the density-gradient tube method. According to the present invention, it is desired that the polyester film has been so molecularly oriented as to have a density over a range of from 1.345 g/cm$^3$ to 1.395 g/cm$^3$.

It is further desired that the film has a thickness of 5 to 50 μm and, particularly, 12 to 40 μm from the standpoint of barrier property against the corrosive components and workability.

According to the present invention, the polyester film can be used in the form of either a single layer or a multi-layer laminated film. In the case of the latter laminated film, the film layer on the side of the metal plate should usually be a polyester layer and the film layer on the side of the inner surface of the container should be a polyester layer containing an anti-blocking agent having grain sizes of from 0.01 to 0.5 μm. The ratio of thickness should lie from 20:80 to 80:20. in order to enhance the adhesiveness of the film, it is usually desired to subject the surface of the biaxially drawn polyester film to the treatment with corona discharge. It is desired that the treatment with corona discharge is effected to such a degree that the wet tension becomes 44 dynes/cm or greater.

It is further allowable to put the surfaces of the film to a known treatment for improving adhesiveness such as plasma treatment or flame treatment, or a coating treatment for improving adhesiveness such as coating with an urethane resin, a modified polyester resin or the like resin.

In order to directly heat-adhere the film and the metal blank together, the metal blank is pre-heated at a temperature close to the melting point of the polyester or higher. The heated metal blank and the film are laminated one upon the other, adhered together with the application of pressure, and are quickly cooled to obtain a laminated material. The two can be heat-adhered together by using an adhesive primer.

The adhesive primer used for the present invention exhibits excellent adhesiveness to both the metal blank and the polyester film. A representative example of the primer paint having excellent intimate adhesiveness and corrosion resistance is a phenol-epoxy type paint consisting of a resol-type phenol-aldehyde resin derived from various phenols and a formaldehyde, and a bisphenol-type epoxy resin, and, particularly, a paint which contains the phenol resin and the epoxy resin at a weight ratio of 50:50 to 5:95 and, particularly, at a weight ratio of 40:60 to 10:90. The adhesive primer layer should be provided having a thickness of usually 0.3 to 5 μm.

It is desired that the polyester film is heat-adhered at a temperature which is lower by 35° C. up to a temperature which is higher by 40° C. than the melting point of the polyester.

It is further desired that the laminated material is rolled at a surface temperature which is lower by 180° C. up to a temperature which is lower by 70° C. than the melting point of the polyester from the standpoint of maintaining molecular orientation on the surface.

Draw-forming, Reduction Draw-forming or Ironing

The above-mentioned laminated material is subjected to the draw-forming, the reduction deep draw-forming or ironing using a means which has been known per se. In this case, it is desired to employ the following conditions.

First, it is desired that the draw-forming, the reduction draw-forming or the draw-ironing is carried out at a temperature suited for drawing the polyester and, particularly, at a temperature higher than a glass transition temperature but lower than the melting point of the polyester. That is, in this temperature range, the polyester undergoes plastic flow during the molding and is effectively and molecularly oriented in the axial direction. During the deep drawing, furthermore, the thickness of the laminate material is effectively reduced by reduction draw-forming due to bend-elongation or draw-ironing.

Furthermore, the above processing treatment is carried out by using a punch and a die in combination. It is desired that the punch has a side surface with an average coarseness (Ra) of 0.01 to 3 μm and, particularly, 0.1 to 2 μm from the standpoint of parting the cup after the working. It is desired that the coarseness usually has a dotted (dimpled) pattern.

The seamless can of the present invention is produced by a method which has been known per se. with the exception of using the above-mentioned laminated material. That is, the laminated material is cut into a circular plate or the like and is subjected to the draw-forming of one stage or a plurality of stages between the drawing punch and the drawing die. In the step of deep draw-forming, the ironing may be effected to a small degree to the upper portion of the side wall of the cup in order to uniformalize the thickness, or the radius of the drawing die in the axial direction may be so selected as to decrease the thickness of the side wall by bend-elongation by giving tensile force. Decreasing the thickness by bend-elongation has been described in detail in Japanese Laid-Open Patent Publication No. 35004/1989 filed by the present inventors. In the case of the deeply drawn can, the draw-forming can be executed in one stage or in a plurality of stages. In the case of one stage, the drawing ratio RD defined by the following formula, $$R_D = \frac{D}{d}$$

where D is a diameter of the laminated material that is cut, and d is a diameter of the punch, should be from 1.2 to 2.5.

In effecting the bend-elongation, the thickness of the side wall of the can should be reduced to 5 to 45% and, particularly, 5 to 40% of the blank thickness ($t_B$), such that the residual factor of the thickness is 55 to 95% and, particularly, 60 to 95%. It is effective to add an ironing operation to the above draw-forming in reducing the thickness of the can.

The ironing can be executed in one stage or in a plurality of stages. In the case of the ironing through one stage, the ironing factor ($R_I$) defined by the following formula, $$R_I = \frac{t_0 - t_I}{t_0} \times 100$$

where to is the thickness of the laminated material of before being worked, and $t_I$ is the thickness of the side wall of the cup, should be from 5 to 40%. In the case of the ironing through the plurality of stages, the ironing factor should be as great as possible in the first ironing, and the ironing factor in the final ironing ring should be 3 to 20% such that the cup after the working can be parted.

As required, the cup obtained by the above operation is subjected to such steps as trimming, volatilization of lubricating agent, printing on the outer surface, and is subjected to the steps of necking and flanging to effect the wrap-seaming with the closure. The polyester film layer obtained by the above forming process to become an inner surface of the can is molecularly oriented monoaxially or biaxially at least in its surface.

EXAMPLES

The invention will now be described in further detail by way of Examples.

Properties of the containers mentioned in this specification are evaluated and measured as described below.

(1) Measurement of Protrusion Shape on the Surface

A. Sampling/measuring Portion

The coated metal plate was sampled in a length of 7 mm and a width of 7 mm in a direction crossing at right angles to the rolled direction of the metal plate, and the protrusion shape in the rolling direction of the metal plate was measured.

The bottom of the container was sampled over an area of 7 mm vertically and 7 mm laterally 25 mm inside from the outer circumference in a direction at right angles with the direction in which the metal plate was rolled. The protrusion shape was measured in the direction in which the metal plate was rolled.

The side wall of the container was sampled over an area of 7 mm vertically and 7 mm laterally at a height of 20 cm from a double wrap-seamed portion in a direction at right angles with the direction in which the metal plate was rolled. The protuberance shape was measured in the direction at right angles with the direction of height of the can.

B. Height (H) of Protrusions

The samples were measured by using an interatomic force microscope (AFM) manufactured by Digital Instrument Co., Nano Scope AFM II. A site having protrusions was selected out of the observation field (100 µm vertical×100 µm lateral), and the surface was observed.

Three-dimensional data (vertical length, lateral length, height) of the surface shape were input.

Three protrusions were selected in the order of decreasing height from the visual field. Images of the selected protrusions that were expanded to about five times as great in both the vertical and lateral directions were output.

Figure 8:
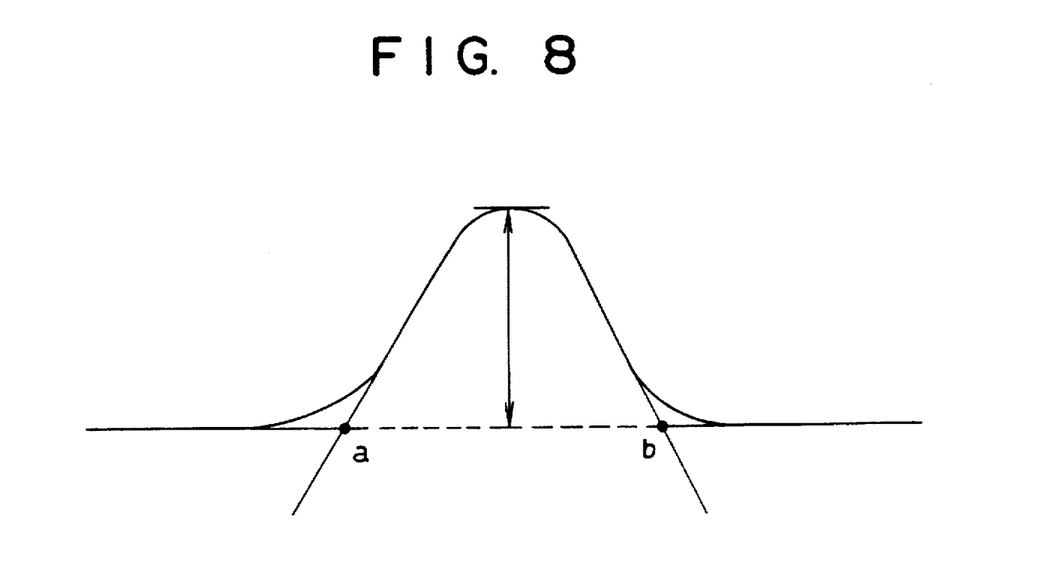
FIG. 8 is a diagram illustrating how to find the height (H) of a protrusion specified by the present invention.

Referring to FIG. 8, the right and left slopes of curves of the protrusion were approximated by two straight lines, and the intersecting points a, b were linked together to describe a base line. The distance from the highest point of the protrusion to the base line was regarded to be the height of the protrusion. An average height of the thus found three points was regarded to be H.

C. Depth (D) of Recesses

Like in the above measurement, three recesses were selected in the order of decreasing depth from the visual field (100 µm vertical×100 µm lateral) observed by using the interatomic force microscope. Images of the selected protrusions that were expanded to about five times as great in both the vertical and lateral directions were output.

Figure 9:
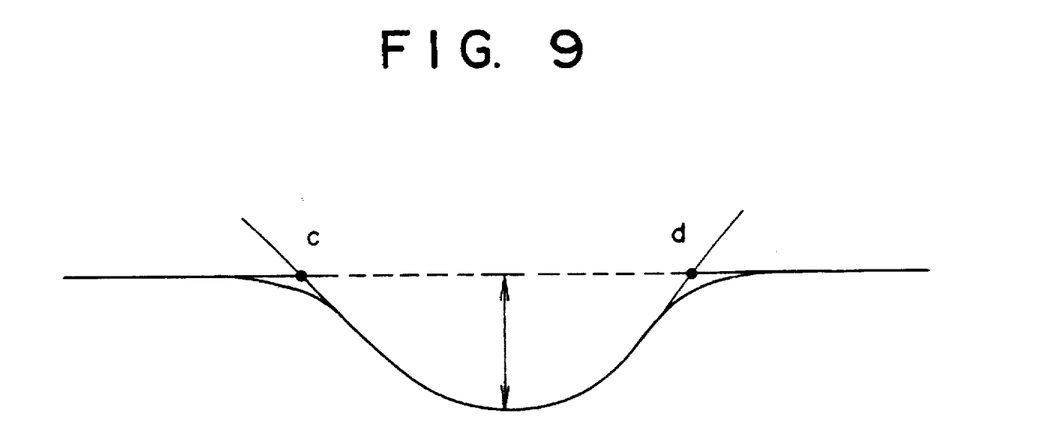
FIG. 9 is a diagram illustrating how to find the depth (D) of a recess specified by the present invention.

Referring to FIG. 9, the right and left slopes of curves of the recess were approximated by two straight lines, and the intersecting points c, d were linked together to describe a base line. The distance from the lowest portion of the recess to the base line was regarded to be the depth of the recess. An average depth of the thus found three points was regarded to be D.

D. Measurement of Biaxial Orientation

The presence of the biaxially oriented crystals is confirmed usually by the X-ray diffraction method, polarized fluorometric method, double refraction method or infrared spectrophotometry. Here, the in-plane orientation coefficient was measured by a method which relies upon the refractive index. The in-plane orientation coefficient was calculated in compliance with the following equation using Abbe's refractive indexes in various directions of the film that were measured under the conditions of using sodium D-ray as a source of light, methylene iodide as an intermediate solution and a temperature of 25° C.

In-plane orientation coefficient=$(\eta_x+\eta_y)/2-\eta_z$ where $\eta_x$: refractive index of the polyester film in the vertical direction, $\eta_y$: refractive index of the polyester film in the lateral direction, $\eta_z$: refractive index of the polyester film in the direction of thickness.

In Examples and Comparative Examples, the in-plane orientation coefficients were shown to indicate the presence of biaxially oriented crystals.

(2) Evaluation of Frothing

Wrap-seamed cans containing cola were allowed to assume room temperature, left to stand still for 40 minutes, opened, and the frothing degrees were evaluated on the basis of the evaluation standards described in this specification. Eleven cans were opened, and majority of evaluations was regarded to be the evaluation of the samples.

(3) Corrosion Resistance

Seamless cans were filled with cola and wrap-seamed and preserved for long periods of time at a temperature of 37° C. to observe the state of corrosion on the inner surface of the can, pitting and leakage.

(Example 1)

A metal plate having an organic coating was obtained by heat-laminating a biaxially drawn polyethylene terephthalate/isophthaiate copolymerized polyester film (12 mol % of isophthaiic acid was copolymerized, m.p. 229° C.) containing silica of a grain size of 0.5 µm in an amount of 0.15% by weight and having a thickness of 25 µm onto both surfaces of a tin-free steel (TFS) plate having a blank thickness of 0.18 mm and a tempering degree of DR-9, followed immediately by cooling with water. A palm oil was applied to the coated metal plate, and a can body was obtained through the two-stage draw-forming. A disk 170 mm in diameter was punched through the first stage of drawing and, then, a cup with flange having a draw ratio of about 1.8 was formed.

Then, the cup with flange having a draw ratio of about 1.43 was formed through the second stage of drawing. The opening edge of the draw-formed cup was subjected to the trimming and flanging in a customary manner to obtain a seamless can having a diameter of 66 mm and a height of 95 mm.

Table 1 shows properties and evaluation of this can.

The frothing was effectively prevented and the can exhibited favorable corrosion resistance.

(Example 2)

A seamless can having properties shown in Table 1 was obtained in the same manner as in Example 1 but heat-laminating a biaxially drawn polyethylene terephthalate film (m.p. 255° C.) containing titanium oxide of a grain size of 0.65 μm in an amount of 0.5% by weight and having a thickness of 20 μm as a biaxially drawn polyester film.

The frothing was effectively prevented and the can exhibited favorable corrosion resistance.

(Example 3)

A deep draw-formed can having properties shown in Table 1 was obtained in the same manner as in Example 1 but heat-laminating onto both surfaces of the tin-free steel (TFS) plate a coextruded biaxially drawn polyethylene terephthalate copolymerized polyester film having a total thickness of 25 μm consisting of a polyethylene terephthalate/isophthalate (7 mol % of isophthalic acid was copolymerized, m.p. 235° C.) film (layer A) containing silica of a grain size of 0.05 μm in an amount of 0.15% by weight and having a thickness of 10 μm and a polyethylene terephthalate/isophthalate (12 mol % of isophthalic acid was copolymerized, m.p. 229° C.) film (layer B) containing silica of a grain size of 2.3 μm in an amount of 0.1% by weight and having a thickness of 15 μm, in a manner that the layer B was in contact with both surfaces of the tin-free steel (TFS) plate.

The frothing was effectively prevented and the seamless can exhibited excellent corrosion resistance.

(Comparative Example 1)

A seamless can having properties shown in Table 1 was obtained in the same manner as in Example 1 but using a biaxially drawn polyethylene terephthalate/isophthalate (5 mol % of isophthalic acid was copolymerized, m.p. 247° C.) containing calcium carbonate of a grain size of 0.8 μm in an amount of 0.10% by weight and having a thickness of 25 μm.

With this can in which the height H of protrusions on the surface of the polyester film on the inner surface of the can was outside the range of the present invention, the frothing wetted the whole surfaces of the can closure. Therefore, the can was not suited for use as a container.

(Comparative Example 2)

A seamless an having properties shown in Table 1 was obtained in the same manner as in Example 1 but using a biaxially drawn polyethylene terephthalate/adipate (12 mol % of adipic acid was copolymerized, m.p. 230° C.) containing kaolin of a grain size of 1.5 μm in an amount of 0.10% by weight and having a thickness of 25 μm.

With this can in which the height H of protrusions and the depth D of recesses in the surface of the polyester film on the inner surface of the can were outside the ranges of the present invention, the froth flowed over the edge of the can closure.

(Comparative Example 3)

A seamless can having properties shown in Table 1 was obtained in the same manner as in Example 1 but containing silica of a grain size of 0.3 μm in an amount of 4.00% by weight.

With this can in which the depth D of recesses in the surface of the polyester film on the inner surface of the can was outside the scope of the present invention, the frothing wetted the whole surface of the can closure. Therefore, the can was not suited for use as the seamless can.

(Example 4)

An adhesive primer paint for the polyester film was prepared as described below. A mixture of phenol and formaldehyde consisting of bisphenol A at a weight ratio of 75% and p-cresol at a weight ratio of 25% was reacted in the presence of a basic catalyst, and was refined and dissolved in a solvent to prepare a solution of a resol-type phenol-formaldehyde resin.

A solution of the bisphenol A-type epoxy resin (Epikote 1009) and a solution of the above cresol-type phenol-formaldehyde resin were mixed together at a solid component weight ratio of 70:30, and were pre-condensed to prepare an adhesive primer paint.

The adhesive primer paint was applied in an amount of 10 mg/dm$^2$ reckoned as a solid content onto one surface of a biaxially drawn polyethylene terephthalate/sebacate (9 mol % of sebacic acid was copolymerized, m.p. 229° C.) copolymerized polyester film containing silica of a grain size of 0.1 μm in an amount of 0.15% by weight and having a thickness of 20 μm, followed by drying at 60° C.

The above copolymer film was heat-laminated on both surfaces of a TFS plate having a blank thickness of 0.15 mm and a tempering degree of DR-9 in a manner that the TFS plate and the adhesive primer were in contact with each other, followed immediately by cooling with water, thereby to prepare a coated metal plate. By applying a glamour wax, the coated metal plate was punched into a disk of a diameter of 187 mm, and a shallow draw-formed cup was obtained in a customary manner. In this draw-forming step, the draw ratio was 1.4.

In the primary, secondary and tertiary redrawing steps, the draw-formed cup was subjected to a redraw formation in which the side wall portion was reduced in thickness by bend-elongation. The primary to tertiary redrawing steps were carried out under the following conditions.

| | |
|---|---|
| Primary redrawing ratio | 1.25 |
| Secondary redrawing ratio | 1.25 |
| Tertiary redrawing ratio | 1.25 |
| Redrawing die Working corner portion Radius of curvature (Rd) | 0.40 mm |

The thus deep redraw-formed cup exhibited the following properties.

| | |
|---|---|
| Diameter of cup | 66 mm |
| Height of cup | 140 mm |
| Change in the thickness of side wall | −20% |

Thereafter, the doming was effected according to a customary manner, the glamour wax was vaporized, the trimming was performed and baking was carried, the printing was effected on the outer surface at 205° C. and, then, the trimming was effected. Then, the necking and flanging were carried out to obtain a seamless can.

Table 1 shows the properties and evaluation of this can.

The frothing was effectively prevented and furthermore the seamless can exhibited excellent corrosion resistance.

(Example 5)

A seamless can having properties shown in Table 1 was obtained in the same manner as in Example 4 but using a biaxially drawn polyethylene terephthalate/isophthalate (12 mol % of isophthalic acid was copolymerized, m.p. 229° C.) copolymerized polyester film containing silica of a grain size of 0.15 μm in an amount of 0.2% by weight and silica of a grain size of 0.45 μm in an amount of 0.05% by weight and having a thickness of 16 μm.

The frothing was effectively prevented and the seamless can exhibited excellent corrosion resistance.

(Example 6)

To both sides of a TFS plate having a thickness of 0.19 mm and a tempering degree of T-5 was laminated the same film as in Example 4 to prepare a coated metal plate. It was coated with glamour wax punched into a circular plate having a diameter of 166 mm to prepare a shallow cup. The drawing ratio in this drawing step was 1.65.

Then in a primary, secondary and tertiary redrawing steps, redrawing-ironing formation step was performed in which the drawn cup was redrawn by reducing the thickness by bending and elongating the side wall portion and simultaneously, ironing was carried out. In the tertiary redrawing step, doming was carried out in which the bottom portion was formed.

The conditions were as follows.

| Primary redrawing ratio | 1.23 |
| Secondary redrawing ratio | 1.24 |
| Redrawing die | |
| Radius of curvature (Rd) of the working coner portion | 0.40 mm |
| Clearance between the punch and the die | |
| Primary redrawing-ironing | 0.137 mm |
| Secondary redrawing-ironing | 0.137 mm |

The seamless can formed by reduction redrawing-ironing had the following properties.

| Diameter of the cup | 66 mm |
| Height of the cup | 126 mm |
| Change in the thickness of the side wall | −35% |

Thereafter, by a customary method glamour wax was evaporated, trimming was carried out, and outside surface printing and baking were carried out. Then, neck-in and flanging were conducted to form a seamless can.

Table 1 shows the characteristics and evaluations.

The frothing was prevented, and a container having excellent corrosion resistance were obtained.

(Example 7)

Both surfaces of a cold-rolled steel plate having a thickness of 0.30 mm and a tempering degree of T-2.5 were plated with tin in an amount of 2.8 g/m² in a customary manner, and were then coated with a film of a hydrated oxide layer of chromium in an amount of 7.0 mg/m² by the widely-known cathodic treatment in dichromic acid. The surface-treated steel plate was heated at 215° C. and onto one surface thereof was heat-laminated a biaxially drawn polyethylene terephthalate/isophthalate (20% of isophthalic acid was copolymerized, m.p. 216° C.) copolymerized polyester film containing silica of a grain size of 0.5 μm in an amount of 0.15% by weight and having a thickness of 25 μm followed immediately by cooling with water to obtain a metal plate having an organic coating.

The plate having organic coating was draw-ironed under the following conditions in a manner that the polyester film was on the inner surface of the DI can.

Draw-ironing Conditions

The metal plate having an organic coating was punched into a diameter of about 140 mm, and a cup having an inner diameter of about 87 mm was formed in a customary manner between a drawing punch and a drawing die.

The cup was then subjected to the ironing by using an ironing punch having the surface of a dimpled shape (1 μm deep) and an ironing die in combination. The sizes of the can barrel were as follows:

| Thickness of barrel wall | 0.105 mm |
| Inner diameter of can barrel | 65.7 mm |
| Height of can barrel | 124 mm |

The obtained DI can was subjected to the steps of removing lubricating agent, washing, drying, printing on the outer surface, baking at 195° C., as well as to the necking and flanging to obtain a draw-ironed can. Table 1 shows the properties and evaluation of this can. The frothing was effectively prevented and the container exhibited good corrosion resistance.

(Comparative Example 4)

The metal plate having organic coating prepared in Example 4 was further heated at 250° C. and was cooled with water to obtain a metal plate coated with the polyester film in which are contained anti-blocking agent particles.

A thickness-reduced deep draw-formed can having properties shown in Table 1 was obtained in the same manner as in Example 4 but using the above coated metal plate.

In the film layer of this can, the unoriented or amorphous crystal structure during the lamination had been crystallized or whitened due to the heat-treatment after the draw-forming. After the passage of time, the can developed UFC (underfilm corrosion) and was not suited for use as a container.

TABLE 1

Properties of draw-formed cans and results of evaluation

| | Examples | | | | | | | Comparative Examples | | | |
|---|---|---|---|---|---|---|---|---|---|---|---|
| | 1 | 2 | 3 | 4 | 5 | 6 | 7 | 1 | 2 | 3 | 4 |
| Polyester film | | | | | | | | | | | |
| Resin composition | PET/I | PET | layer A PET/I | layer B PET/I | PET/S | PET/I | PET/S | PET/I | PET/I | PET/A | PET/I | PET/S |
| Melting temp. (°C.) | 229 | 255 | 235 | 229 | 229 | 229 | 229 | 216 | 247 | 230 | 229 | 240 |
| Anti-blocking agent | | | | | | | | | | | |
| Chemical composition | silica | titanium oxide | layer A silica | layer B silica | silica | silica | silica | silica | calcium carbonate | kaolin | silica | silica |
| Grain size (μm) | 0.50 | 0.65 | 0.05 | 2.30 | 0.10 | 0.15 0.45 | 0.10 | 0.50 | 0.80 | 1.50 | 0.80 | 0.10 |
| Amount added (wt %) | 0.15 | 0.50 | 0.15 | 0.10 | 0.15 | 0.20 0.05 | 0.15 | 0.15 | 0.10 | 0.10 | 4.00 | 0.15 |
| Presence of Biaxial orientation (in-plane orientation coefficient) | yes 0.066 | yes 0.078 | yes 0.038 | | yes 0.042 | yes 0.062 | yes 0.042 | yes 0.022 | yes 0.051 | yes 0.090 | yes 0.070 | no 0.005 |
| Shape of protrusions on the laminate metal plate surface | | | | | | | | | | | |
| Height of the protrusion (H) | 0.16 | 0.18 | 0.04 | — | 0.09 | 0.10 | 0.09 | 0.15 | 0.25 | 0.66 | 0.21 | 0.08 |
| Depth of recess (D) | 0.008 | 0.014 | 0.000 | — | 0.000 | 0.005 | 0.000 | 0.005 | 0.025 | 0.080 | 0.020 | 0.005 |
| Shape of protrusions on the bottom surface | | | | | | | | | | | |
| Height of the protrusion (H) | 0.16 | 0.19 | layer A 0.05 | — | 0.10 | 0.10 | 0.12 | 0.16 | 0.24 | 0.65 | 0.22 | 0.00 |
| Depth of recess (D) | 0.010 | 0.013 | 0.000 | — | 0.000 | 0.000 | 0.005 | 0.010 | 0.020 | 0.070 | 0.020 | 0.000 |
| Shape of protrusions on the surface of the side wall portion | | | | | | | | | | | |
| Height of the protrusion (H) | 0.18 | 0.19 | 0.05 | — | 0.12 | 0.15 | 0.16 | 0.17 | 0.26 | 0.70 | 0.25 | 0.001 |
| Depth of recess (D) | 0.010 | 0.015 | 0.000 | — | 0.003 | 0.005 | 0.007 | 0.012 | 0.020 | 0.080 | 0.020 | 0.007 |
| Frothing property | ○ | ○ | ◎ | ◎ | ◎ | ◎ | ◎ | ○ | Δ | X | Δ | ◎ |
| Corrosion resistance | no abnormality | no abnormality | no abnormality | | no abnormality | no abnormality | no abnormality | no abnormality | no abnormality | no abnormality | no abnormality | UFC developed |
| Total evaluation | ○ | ○ | | ◎ | ◎ | ◎ | ◎ | ○ | Δ | X | Δ | X |

PET: polyethylene terephthalate
PET/I: polyethylene terephthalate/isophthalate
PET/A: polyethylene terephthalate/asipate
PET/S: polyethylene terephthalate/sebacate
UFC: underfilm corrosion In producing the draw-formed cans, thickness-reduced draw-formed cans or draw-ironed cans using a laminated material of a metal plate and a polyester film according to the present invention, use is made of the polyester film which on the inner surface side of the can has a surface which is at least molecularly oriented in the biaxial directions and has protrusions of a height of 0.20 μm or smaller as measured using an interatomic force microscope. When the cans containing carbonated beverages are opened, the frothing phenomenon is effectively prevented and underfilm corrosion is effectively prevented, too.

We claim:

1. A seamless, froth-preventing and corrosion-resistant metal can comprising a can formed from a metal plate and a polyester film layer bonded at an inside surface of the can wherein at least a surface of said polyester film is oriented molecularly in biaxial directions so that the surface of said layer has an inplane orientation coefficient of at least 0.022 and a coarse portion selected from the surface in the can over a visual field of 100 μm×100 μm in an interatomic force microscope has a three-point average height (H) of large protrusions of 0.20 μm or smaller.

2. A seamless can according to claim 1 wherein a coarse portion is selected from the surface inside the can over a vision of 100 μm×100 μm by using an interatomic force microscope and a three-point average depth (D) of large concave portions measured on this portion is 0.02 μm or smaller as measured on this portion.

3. The seamless can according to claim 1 wherein an adhesive primer is interdisposed between said inner surface side of said metal can and said polyester film layer.

4. The seamless can according to claim 1 wherein said polyester film layer contains an anti-blocking agent having a grain size of form 0.05 to 0.7 μm.

5. The seamless can according to claim 1 wherein said polyester film layer is a laminated film consisting of an inner layer of a polyester next to said inner surface side of said metal can, and a surface layer of a polyester on top of said inner layer containing an anti-blocking agent having a grain size of from 0.01 to 0.5 μm, and .

6. A seamless, froth-preventing and corrosion-resistant metal can obtained by reduction draw-forming or draw-ironing a laminated material of a metal plate comprising a can formed form a metal plate, a polyester film layer comprising ethylene terephthalate units, and an adhesive primer layer interposed between the metal plate and the polyester film layer, wherein a side wall of the can has a thickness residual factor of 55 to 95%, wherein at least a surface of the polyester film layer at an inside surface of the can is oriented molecularly in biaxial directions so that the surface of said layer has an inplane orientation coefficient of at least 0.022 and a coarse portion selected from the surface in the can over a visual field of 100 μm×100 μm in an interatomic force microscope has a three-point average height (H) of large protrusions of 0.20 μm or smaller.

* * * * *